Nov. 22, 1949     J. T. LIENHARD     2,489,095
ANIMAL TRAP THROWOUT PROOF DEVICE

Filed Dec. 12, 1946     2 Sheets—Sheet 1

INVENTOR.
JOSEPH T. LIENHARD
BY
ATTORNEY

Nov. 22, 1949 J. T. LIENHARD 2,489,095
ANIMAL TRAP THROWOUT PROOF DEVICE
Filed Dec. 12, 1946 2 Sheets-Sheet 2
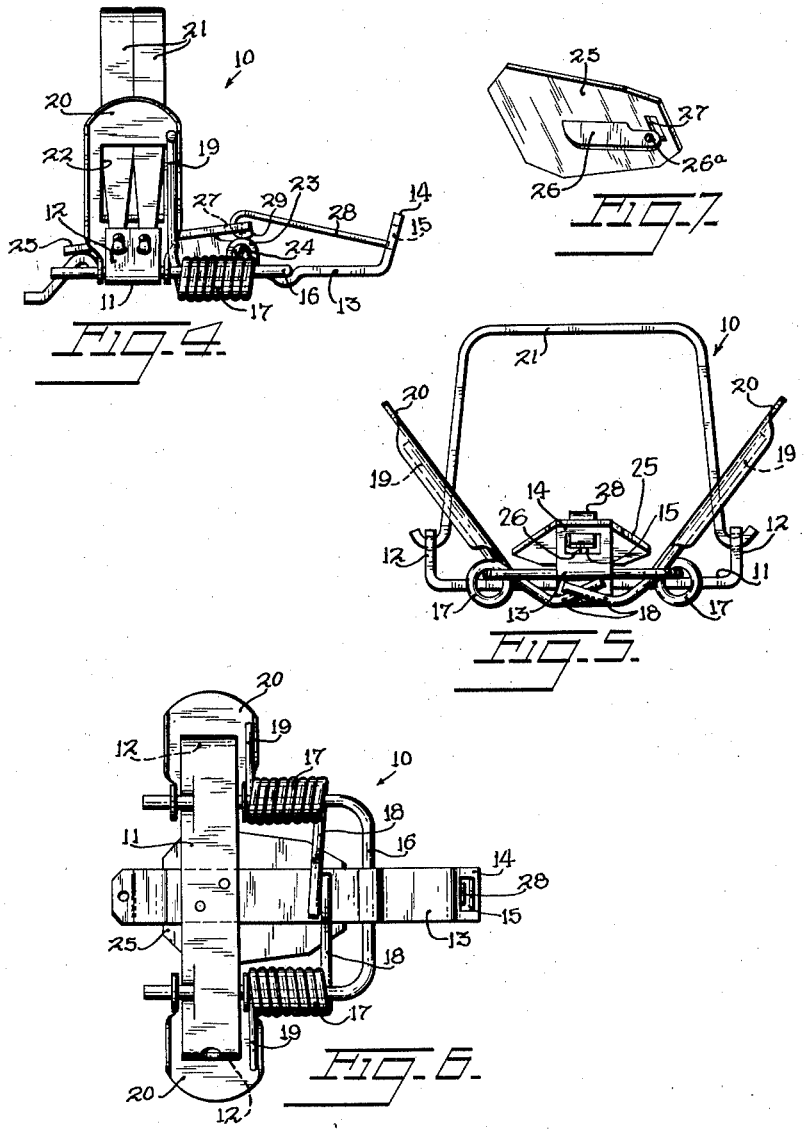
INVENTOR.
JOSEPH T. LIENHARD
BY
ATTORNEY Patented Nov. 22, 1949

2,489,095

UNITED STATES PATENT OFFICE 2,489,095

ANIMAL TRAP THROWOUTPROOF DEVICE

Joseph T. Lienhard, Bronx, N. Y.

Application December 12, 1946, Serial No. 715,823

1 Claim. (Cl. 43—92)

The present invention concerns an animal trap throwout proof device and relates more particularly to such a device in a trap comprising a pan on which the animal is intended to step in order to spring the trap.

In conventional animal traps comprising jaws which are spring actuated toward each other upon the release of the trap, it has been customary to hold the jaws open by a dog pivoted to the cross member on the trap and engaging a detent comprised by the pan of the trap. Downward pressure on the pan of the trap would be the only way to spring the trap.

An object of the present invention is to provide a trap which may be sprung by downward pressure on the dog as well as by downward pressure on the pan.

In conventional animal traps, when an animal steps on the pan and any part of his foot rests on top of the dog, the trap is released with the dog throwing the animal's foot out because the dog swings outwardly.

In the animal trap of the present invention, if the animal steps on the pan or the dog or any part of his foot comes in contact with the dog, the downward pressure will cause the dog to snap out of the aperture inwardly thereby springing the trap and trapping the animal's foot inside the device.

In accomplishing the objects of the present invention, a trap is provided in which the dog is pivoted to the pan and engages a detent aperture formed in the cross member. The pan is pivotally mounted on the pan posts by a lever arm which extends upward from the pivotal connection and the pan extends from a point above the pivotal connection to a length of several inches therefrom. The dog is pivotally connected thereto and extends into an aperture in the rigid cross member. As a result of this construction, downward pressure on either the pan or the dog causes the pan to pull the dog longitudinally out of the aperture and thus spring the trap.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 4 is a side elevational view of a portion of the trap, the jaws being sprung.

Fig. 5 is an end elevational view of Fig. 4.

Fig. 6 is a bottom plan view of Fig. 3, but omitting the jaws.

Fig. 7 is a perspective detailed view of the pan used in this device.

Figure 1:
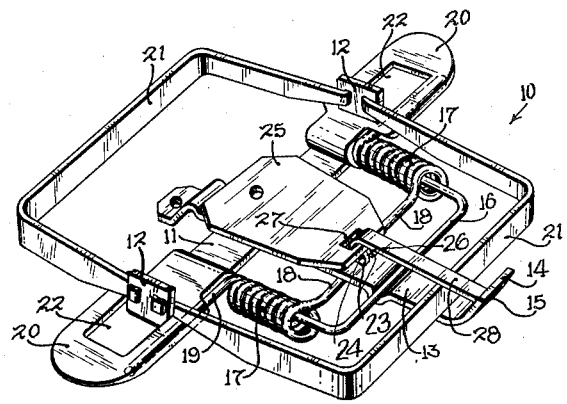
Fig. 1 is a perspective view of the improved trap throw-out means embodied in a double jaw coiled spring type of trap.

Referring now in detail to the drawings, the trap 10 comprises the bottom member 11 which terminates at either end in the jaw posts 12 which are vertically upturned integral portions thereof. Extending horizontally from the mid-point of the bottom portion and at right angles thereto is the cross member 13 which terminates in an upturned detent portion 14 formed with the detent aperture 15 therein. The spring frame 16 is a substantially U-shaped piece of very stiff wire extending horizontally from the bottom portion 11 and about the two legs of which are located coil springs 17, one free end 18 of each coil spring engages the cross member 13 and the other free end 19 of each of the springs 17 engages one of a pair of spring follower plates 20. U-shaped jaws 21 are pivotally connected to the jaw posts 12 to swing in arcs extending oppositely from the bottom member 11. The spring follower plates 20 are substantially flat stiff members pivotally connected to the spring frame 16 and formed with apertures 22 through which the jaw posts 12 extend and through which the terminal portions of the jaws 21 also extend.

A pan post 23 is mounted on the cross member 13 and constitutes a standard for a pan pivot 24 on which a pan 25 is mounted by means of an upward and inward extending lever arm 26 which is connected to the pan 25 at substantially its central point and for some distance longitudinally outward therefrom.

Pan 25 is a substantially flat member extending from a point substantially above the pan post 23 and the pivot 24 for a length of several inches in the direction of the bottom portion 11. Pan 25 is formed with a dog aperture 27 for the reception of a dog 28 which is a flat elongated member comprising a hook 29 engaging the aperture 27. The free end of dog 28 is engageable with detent portion 14 of the cross member 13 by means of the aperture 15 in the detent portion 14.

Figure 3:
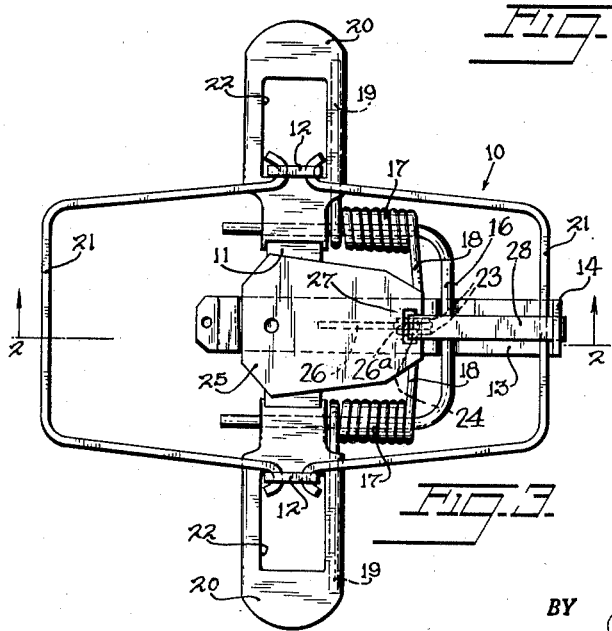
Fig. 3 is a top plan view of the device.

Referring in particular to Figs. 3, 4 and 5, it is clear that aperture 27 is located inward of aperture 26a in lever arm 26 relative to pan 25. Downward pressure on dog 28, therefore, is effective to depress pan 25 and then spring the trap.

Figure 2:
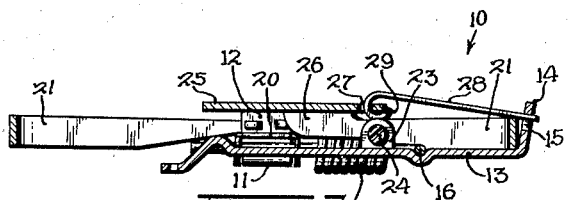
Fig. 2 is a section on the line 2—2 of Fig. 3.

Trap 10 embodying the present device operates as follows:

In Figs. 1 and 2, the trap is shown as set, spring follower leaves or plates 20 having been depressed from the position of Fig. 5, thus loading springs 17 and permitting the jaws to be opened. Dog 28 is pivoted over the adjacent jaw 21 and inserted in aperture 15 of cross member 13. Downward pressure on either the pan 25 or the dog 28 now results in depressing the pan 25 and pulling the dog 28 longitudinally to the left of Fig. 2 so that the free end thereof is pulled out of the aperture 15; the jaws 21 being thus released, are forced upward by the spring follower plates 20 which are actuated by the springs 17 and the jaws are snapped shut, thereby trapping the animal in the device with his foot thrown inside the trap by the inward action of the released dog.

Referring in particular to Figs. 5 and 7 it is clear that aperture 27 being inward of pan 25 relative to aperture 26ª, which is adapted to receive the pivot 24, downward pressure on dog 28 alone is exerted against the outer wall of aperture 27 and since this wall is inward of the axis of aperture 26ª, the result is that pan 25 pivots downward around pivot 24 and pulls dog 28 leftward longitudinally as previously explained, springing the trap.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In an animal trap having an elongated bottom member with a cross member extending laterally from one side of the bottom member and having its free end bent upward and formed with an aperture, and a pair of arcuate jaws pivotally mounted on the ends of the bottom member so that one jaw may be pivoted to extend across the cross member inward of the upturned end of the cross member, a vertical pan post mounted on the cross member to be within the one jaw when said jaw is pivoted to extend across the cross member and formed at its top end with a hole, a pan, a lever arm having its top edge secured on the bottom face of said pan inward of the top edge of the pan facing the upturned end of the cross member and having a portion extended downwardly and outwardly toward the upturned end of the cross member, said lever arm having the top edge of its downwardly and outwardly extending portion spaced slightly from the bottom face of said pan and formed with a hole aligned with the hole of said pan post, a pivot member engaged through the aligned holes of said pan post and said lever arm, and a dog extended laterally from the side of said pan above the lower end of said lever arm to have its free outer end extended across the one jaw and into the aperture of the upturned end of the base, said pan being formed with an aperture inward of the edge immediately above the downwardly and outwardly extended portion of said lever arm, said dog having its inner end bent into a hook and turnably engaged through said aperture of said pan.

JOSEPH T. LIENHARD.

REFERENCES CITED

The following references are of record in the file of this patent:

UNITED STATES PATENTS

| Number | Name | Date |
| --- | --- | --- |
| 529,129 | Mead | Nov. 13, 1894 |
| 1,122,151 | Petty | Dec. 22, 1914 |
| 1,539,103 | Alston | May 26, 1926 |
| 1,948,199 | Booth | Feb. 20, 1934 |
| 2,247,632 | Graybill | July 1, 1941 |